US006160903A

United States Patent [19]

Hamid et al.

[11] Patent Number: 6,160,903

[45] Date of Patent: Dec. 12, 2000

[54] METHOD OF PROVIDING SECURE USER ACCESS

[75] Inventors: Laurence Hamid; Robert D. Hillhouse, both of Ottawa, Canada

[73] Assignee: DEW Engineering and Development Limited, Ottawa, Canada

[21] Appl. No.: 09/065,523

[22] Filed: Apr. 24, 1998

[51] Int. Cl.[7] .......... G06K 9/00

[52] U.S. Cl. .......... 382/115; 382/116; 382/124

[58] Field of Search .......... 382/115–118, 124–127, 382/159, 155; 380/23; 704/275, 273, 270; 340/825.31; 902/3; 235/380, 381, 382, 382.5, 379

[56] References Cited

U.S. PATENT DOCUMENTS

| | | | |
|---|---|---|---|
| 4,713,753 | 12/1987 | Boebert et al. | 711/164 |
| 5,018,096 | 5/1991 | Aoyama | 711/164 |
| 5,648,648 | 7/1997 | Chou et al. | 235/382 |

FOREIGN PATENT DOCUMENTS

| | | | |
|---|---|---|---|
| 0 762 340 A2 | 3/1997 | European Pat. Off. | G07C 9/00 |
| WO 91/08555 | 6/1991 | United Kingdom | G07C 9/00 |
| 2271657 | 4/1994 | United Kingdom | G06K 9/62 |
| WO 98/32093 | 7/1998 | United Kingdom | G06K 9/00 |

*Primary Examiner*—Jose L. Couso
*Assistant Examiner*—Shawn Cage
*Attorney, Agent, or Firm*—Freedman & Associates

[57] ABSTRACT

A method of providing secure user access for doorways and network computer systems is disclosed. An overall system security level is provided. A user provides biometric information that is compared against stored biometric information of each of a plurality of users to identify the individual. When the likelihood of a match is above the likelihood necessary for identification, the threshold for that user is increased. Optionally, a threshold for another user is lowered in order to maintain a same system security level. When biometric information provided to the system is consistent, the stored template is automatically updated.

16 Claims, 13 Drawing Sheets

| Template | Source | Individual | Security Level | History |
|---|---|---|---|---|
| 001.fil | left index | Rob | 1 - 1/1,000,000 | 270,265,268 |
| 002.fil | left index | Sue | 1 - 1/100,000 | 200,180,160 |
| 003.fil | right thumb | Rob | 1 - 1/1,000,000 | 270,265,268 |

| Template | Source | Individual | Security Level | History |
|---|---|---|---|---|
| 001.fil | left index | Rob | 1 - 1/1,000,000 | 270,265,268 |
| 002.fil | left index | Sue | 1 - 1/100,000 | 200,180,160 |
| 003.fil | right thumb | Rob | 1 - 1/1,000,000 | 270,265,268 |

FIGURE 3A

| | |
|---|---|
| MINIMUM SYSTEM SECURITY LEVEL | 1 - 1/10,000 |
| MINIMUM INDIVIDUAL SECURITY LEVEL | 1 - 1/60,000 |
| UPDATE TEMPLATES AUTOMATICALLY | Y |
| ADJUST INDIVIDUAL SECURITY LEVELS DOWN | Y |

FIGURE 3B

METHOD OF PROVIDING SECURE USER ACCESS

FIELD OF THE INVENTION

This invention relates generally to identification of biometric data and more particularly relates to a method of identifying an individual from a predetermined group of individuals upon presentation of biometric information to the system.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security.

Password protection and/or combination type locks are employed for computer network security, automatic teller machines, telephone banking, calling cards, telephone answering services, houses, and safes. These systems generally require the knowledge of an entry code that has been selected by a user or has been configured in advance.

Pre-set codes are often forgotten, as users have no reliable method of remembering them. Writing down the codes and storing them in close proximity to an access control device (i.e. a combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords that are relatively insecure. As such, many password systems are easily accessed through a simple trial and error process.

A most common building security system is a security guard. A security guard reviews identification cards and compares pictures thereon to a person carrying the card. The security guard provides access upon recognition or upon other criteria. Other building security systems use card access, password access, or another secure access approach. Unfortunately, passwords and cards have the same drawbacks when used for building security as when used for computer security.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system is prompted through user entry that a fingertip is in place for image capture. This is impractical as it likely requires the use of two hands. Another method of identifying fingerprints is to capture images continuously and to analyse each image to determine the presence of biometric information such as a fingerprint. This method requires significant processing image transfer times and is therefore, not suited to many applications.

The use of a biometric imaging device with a personal computer is considered inevitable. Unfortunately, using a biometric input device to transmit frames repeatedly according to the second method above, wastefully consumes significant bandwidth and processing time. As indicated above, the first method that is commonly used, requires the use of two hands.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

Xiao Qinghan and Bian Zhaoqi: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, *An Automated Fingerprint Identification System*, NBS special publication, U.S. Department of Commerce/National Bureau of Standards, ISSN 0083–1883; no. 500–89, 1982;

Moenssens, Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500-36, 1978.

For doorway security systems, biometric authentication systems have many known problems. For example, a user identification code, a PIN, is required to identify each individual in order to permit comparison of the biometric information and a single user's template. Remembering a PIN is inconvenient and the device needed to accept a PIN is subject to damage and failure. The device is also an additional expense in a doorway access system. Since a single processor can provide processing for several doors, for a multiple doorway system, the PIN entry unit forms a significant portion of the overall system cost.

It would be advantageous to provide a system wherein provision of a PIN is not necessary for identification.

In evaluating security of biometric authorization systems, false acceptance and false rejections are evaluated as a fraction of a user population. A security system is characterized as allowing 1 in 1,000 false acceptances or, alternatively, 1 in 1,000,000. Typically a probability distribution curve establishes a cut off for a given registration to determine what false acceptance rate this reflects. Curves of this type are exponential in nature and, therefore for better false acceptance rates, provide only nominal improvements to false acceptance rate for significant changes to a threshold value. Typically when using a biometric information sample, a low match score results in failure to authorize an individual.

In the past, a one-to-many search of biometric information has been considered undesirable because security is compromised. For example, when a single biometric template is compared and a resulting comparison having a $1/_{1,000,000}$ likelihood of false acceptance is desired, it is clear that $1/_{1,000,000}$ users may be misidentified. However, when a forty user system is provided with equivalent individual comparison criteria, the probability of false acceptance escalates to $1-(0.999\,999)^{40}$ which is about $1/_{25,000}$. Whereas $1/_{1,000,000}$ is acceptable for many applications, $1/_{25,000}$ is likely not as acceptable. Further, as the number of individual templates in the many grows, the rate of false acceptance increases; when 250 templates exist, a likelihood of about $1/_{4,000}$ of false acceptance exists.

In order to solve this problem, one might reduce the false acceptance rate to $1/_{10,000,000}$; however, this results in problems identifying some people and make such a system inconvenient. A system of this type is unlikely to provide consistent results and therefore, requires a security guard at at least a door to provide access for those who are not identifiable to $1/_{10,000,000}$.

OBJECT OF THE INVENTION

It is an object of this invention to provide a method of maintaining a desired level of security in a one-to-many biometric information comparison system.

SUMMARY OF THE INVENTION

In accordance with the invention there is provided a method of using a biometric security system to perform one of authorising individuals and identifying individuals. The method comprises the steps of: storing a system security level; determining an initial security level for a plurality of individuals, the initial security level determined such that the actual security level of the system is at least the stored system security level; storing a current security level in association with at least one of an identification of an individual and an authorisation of an individual; performing at least one of authorising individuals and identifying individuals using the biometric security system; determining individuals who are consistently authorised or identified with a higher level of security than the current security level associated with said individuals; and increasing the current security level associated with the determined individuals.

In an embodiment the method also includes the steps of: determining individuals who are consistently authorised or identified with a lower level of security than the current security level associated with said individuals; and lowering the current security level associated with the determined individuals such that the resulting actual system security level is at least the stored system security level.

In accordance with another embodiment of the invention, there is provided a method of identifying an individual from a plurality of enrolled individuals for use in a system comprising means for storing a plurality of biometric templates, each biometric template associated with an identity and a security level, some of the biometric templates associated with different security levels. The method comprises the steps of: receiving biometric information from the individual and providing biometric data based on the biometric information; comparing the biometric data to some templates from the plurality of biometric templates to determine a likelihood that a first template from the plurality of templates and the biometric data match; retrieving the associated security level associated with the first template; and when the likelihood is indicative of a match with a level of security at least the associated security level, identifying the individual.

In accordance with the invention there is provided a method of authorising an individual from a plurality of enrolled individuals for use in a system comprising means for storing a plurality of biometric templates, each biometric template associated with a security level, some of the biometric templates associated with different security levels. The method includes the steps of receiving biometric information from the individual and providing biometric data based on the biometric information; comparing the biometric data to some templates from the plurality of biometric templates to determine a likelihood that a first template from the plurality of templates and the biometric data match; retrieving the associated security level associated with the first template; and when the likelihood is indicative of a match with a level of security at least the associated security level, authorising the individual.

In accordance with another aspect of the invention there is provided a system for performing one of authorising an individual and identifying an individual from a plurality of individuals upon presentation of biometric information of the individual. The system comprises means for storing a plurality of biometric templates, each biometric template associated with a security level wherein some templates are associated with different security levels; means for receiving biometric information from the individual and providing biometric data based on the biometric information; means comparing the biometric data to some templates from the plurality of biometric templates to determine a likelihood that a first template from the plurality of templates and the biometric data match; means retrieving the associated security level associated with the first template; and means for performing at least one of identifying the individual and authorising the individual when the likelihood is indicative of a match with a level of security at least the associated security level.

It is an advantage of the present invention that a separate indication of the presence of a fingerprint is not necessary to capture a fingerprint.

BRIEF DESCRIPTION OF THE DRAWINGS

An exemplary embodiment of the invention will now be described in conjunction with the attached drawings, in which:

FIG. 3*a* is a table of data for use with the invention;

FIG. 3*b* is a table of data for use with the invention;

DETAILED DESCRIPTION

The invention is described with respect to fingerprint registration. The method of this invention is applicable to other biometric information as is evident to those of skill in the art.

In a common method of capturing biometric information according to the prior art, a fingertip is pressed against a fingerprint imaging means in the form of an optical fingerprint imager or a capacitive fingerprint imager. The system accepts a signal provided by the imaging device as a fingerprint image. The image is characterised and, when biometric information is found, it is registered against that of a known person to identify an originator of the fingerprint. Once identified, appropriate action is taken.

Figure 1:
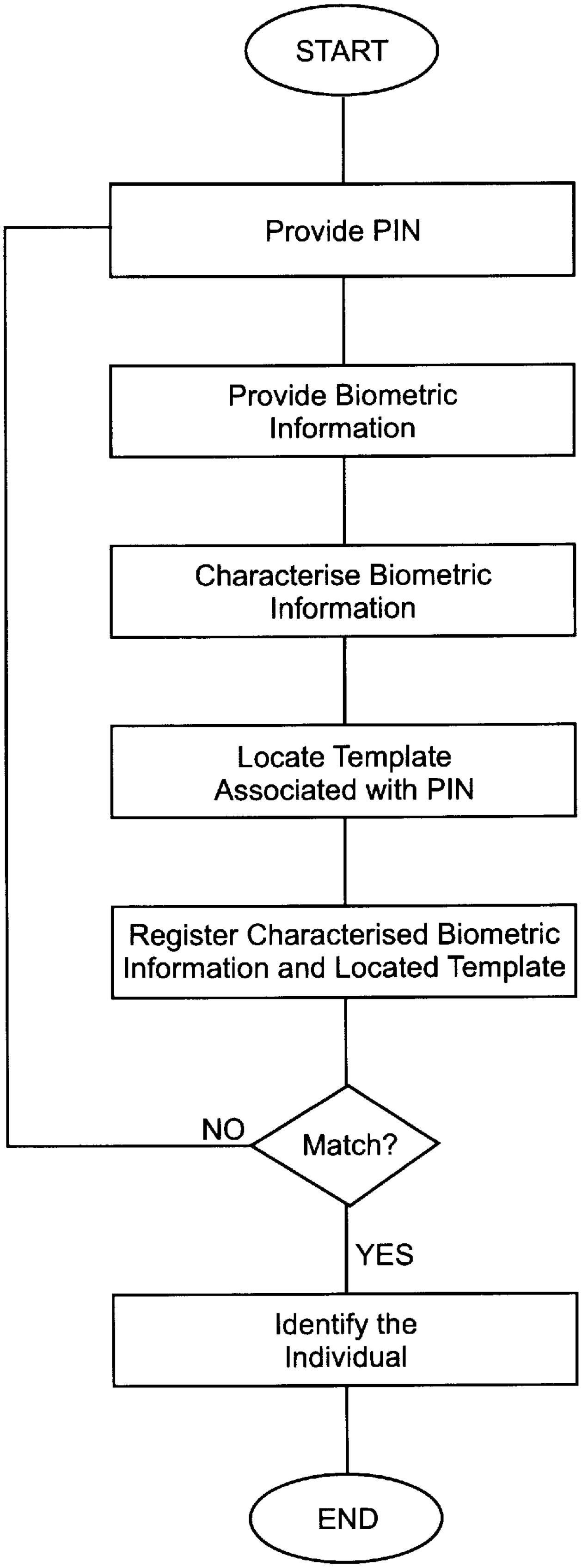
FIGURE 1 PRIOR ART
FIG. 1 is a flow diagram of a method of authorising an individual based on biometric information according to the prior art.

Referring to FIG. 1, a simplified flow diagram of a method of performing a one-to-many search on biometric information is shown. A personal identification number (PIN) is captured. Biometric information is then captured. Biometric data is determined from the biometric information by, for example, a characterisation process. In fingerprint recognition, this process often involves locating a fingerprint centre and then extracting features based on the fingerprint centre. The biometric data is then registered against a single biometric template stored in a database and associated with the PIN. Optionally, more than one biometric template of a same individual is stored in association with the PIN. The registration is performed according to a known registration process and results in a value or values that are indicative of a likelihood of a correct match. A threshold likelihood is known and, when results of a registration, the likelihood, is above the threshold likelihood, the template and the biometric data are said to match. An identity associated with the template and the PIN is then determined. Alternatively, authorisation to access a system, an area, or to perform a task is provided. Further alternatively, both are performed. Accordingly, each biometric template is registered against one or a small number of biometric templates and the problems heretofore discussed relating to low security levels of one-to-many searching are avoided.

Figure 2:
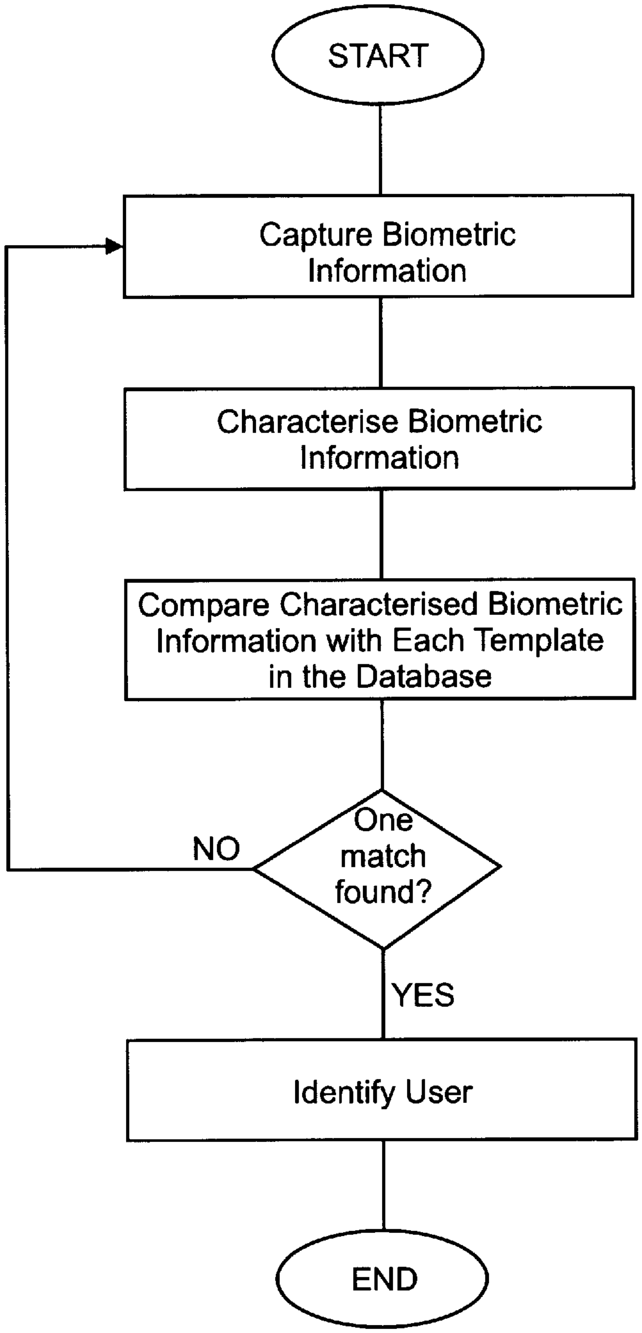
FIGURE 2 PRIOR ART
FIG. 2 is a flow diagram of a one to many search within a database of biometric information according to the prior art.

Referring to FIG. 2, a simplified flow diagram of a method of performing a true one-to-many search on biometric information is shown. Biometric information is captured. Biometric data is determined from the biometric information by, for example, a characterisation process. For example, in fingerprint recognition, this process involves locating a fingerprint centre and then extracting features based on the fingerprint centre. The biometric data is then registered against each biometric template in a database. The registration is performed according to known registration processes and results in a value or values that are indicative of a likelihood of a correct match. A threshold likelihood is known and, when the registration results in a single likelihood above this threshold, the template and the biometric data are said to match. An identification associated with the template is then determined. Of course, to enhance performance, data structures or hashing are used to reduce an overall number of registrations required to identify an individual.

Such a system is useful for very small groups of individuals with very good biometric information sources; however, when biometric information is less easily characterised or registered or when populations are large, such a system is inherently insecure. As stated above, registering individuals with a likelihood of false acceptance of $1/_{1,000,000}$ when 1,000 biometric templates are stored in the database, results in approximately $1/_{1,000}$ people being falsely accepted. This is often an insufficient level of security. Worse yet, even with this low level of security, some employees with poor quality biometric information sources will be unable to access the system or facility absent human intervention. Of course, for 5 employees, such a system can provide reasonable levels of security.

Further, when more than one user is potentially identified—registration with different templates resulted in values above the threshold—the user is rejected. This poses problems for some users. A method of refining the search criteria using, for example, flexible verification as set out below or using a different biometric information sample alone is then used to identify the individual uniquely. Using a plurality of biometric information samples from different sources—index finger, thumb, voice, retina, etc.—also provides a method of reducing false acceptance rates for each user identification process and thereby reducing the overall false acceptance rate of the system.

Referring to FIG. 3*a*, a table of data is shown for use with a method according to the invention. An individual is associated with a number of biometric information sources. For each source, a security level is stored in the form of a threshold registration value. A number of past biometric information samples are stored as well as associated past registration results. The information is used to maintain system security while providing significant flexibility. The threshold registration value is a non-linear likelihood that the registration is accurate. Higher registration values indicate a more secure registration. Alternatively, lower registration values indicate a more secure registration. More secure registrations indicate security levels above the threshold security level and registration values corresponding to a less secure registration are indicative of security levels below those registration values corresponding to a more secure registration.

Referring to FIG. 3*b*, a table of data is shown for use with a method according to the invention. The table comprises system wide information. Here a Minimum System Security Level (MSSL) is provided, as is a Minimum Individual Security Level ($S_{min}$) and other system level information and preferences. The application of the data in the tables of FIGS. 3*a* and 3*b* is discussed below with reference to FIG. 4.

Figure 4:
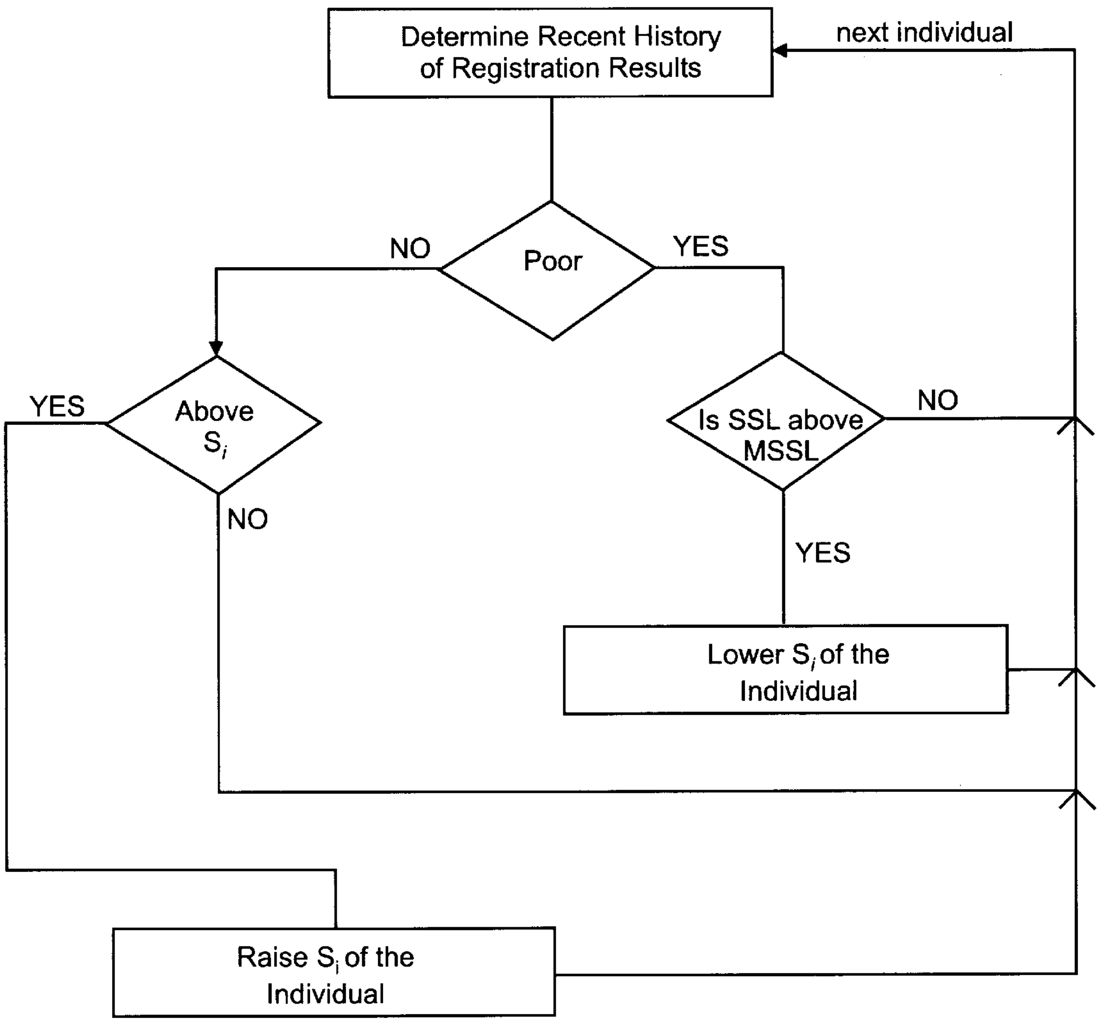
FIG. 4 is a simplified flow diagram of a method of adjusting individual security levels for verification of biometric information according to the invention.

Referring to FIG. 4, a simplified flow diagram of a method according to the invention is shown. At start up, each individual is assigned a security level $S_o$ equal to the greater of the minimum individual security level, $S_{min}$, and $S_{eq}$, where $$(S_{eq})^N = \text{Minimum System Security Level (MSSL)}.$$

Therefore, at system start-up, all individuals have identical security levels. Of course, variations on this are possible and are within the scope of the invention. According to the invention, these security levels are then modified through system use. Initially, each user uses the system with the assigned security level, $S_o$. Some users have no trouble accessing the system, others require numerous attempts, and others can not access the system reliably. Security levels associated with individuals having no trouble accessing the system are evaluated and some security levels $S_i$, which are initially equal to $S_o$, are increased to better reflect normal registration results for each individual. Having increased the security level, $S_i$, of some individuals results in a higher level of overall security as expressed by $$\prod_{i=1}^{N} S_i$$

which is currently above MSSL. Unless the original value $S^o$ is equal to $S_{min}$, the values of $S_i$ corresponding to those individuals who can not reliably access the system are lowered until the total system security level is approximately equal to MSSL. Alternatively, the values of $S_i$ are lowered such that the total system security level remains above MSSL.

As system usage continues and people become more experienced in providing biometric information to a biometric input device, it is likely that their registration values will also increase. This enables an increase in the security level, $S_i$, associated with those individuals. The overall system security level increases and security levels $S_i$ associated with other individuals who are identified with difficulty or not at all are then lowered to maintain the security level at approximately MSSL. The result is a system that provides transparent adaptation to support users who are easily identified and those who are not. Of course, when all users provide consistent biometric information, the resulting values of $S_i$ provide a level of security well above MSSL.

During an initial start-up period, a system security level is set at MSSL, while values of $S_i$ of the individual users are adjusted. After a while, the value of $S_i$ for each user has already been a minimum value for that user and each is maintained or increased. This results from experience in using the system and from individual learning curves. When each value of $S_i$ is increased or maintained constant, the system security level SSL is often above the MSSL. A system according to the invention therefore provides an automatic and dynamic method of adapting system security to provide a high level of security in a flexible environment. One of the key aspects to achieving this result is providing each individual with a value of $S_i$ where some individuals have different values of $S_i$.

For example in a system having 10 users, a minimum individual security level of $1/10{,}000$ and a MSSL of $1/10{,}000$, $S_o$ is approximately $1/100{,}000$ ($1-99{,}999^{10}/100{,}000^{10}$ is approximately $1/10{,}000$). If 5 of the users register with a likelihood above $1/1{,}000{,}000$—an order of magnitude better—then the resulting system security level is $(1-(1/1{,}000{,}000)^5(1/100{,}000)^5)$, which is significantly better than $1/10{,}000$; it is actually close to $1/18{,}182$. By changing $S_i$ of those 5 individuals, the resulting system security level is improved. Optionally, the overall security level is readjusted toward MSSL by lowering the security level of the other individuals. For example, each could have their $S_i$ reduced to $1/60{,}000$. This results in a system security level of about $1/11{,}300$ which is above MSSL and therefore acceptable. Of course, there are many benefits to increasing the security level, $S_i$, of the first five individuals—System security is increased, potential for false acceptance of people with similar biometric information is reduced, and confidence in the system is increased.

It has been found that individuals who are new to biometric security systems often have trouble remaining consistent in providing biometric information. This problem often disappears over time because of experience. As individuals use a system and improve their consistency in providing biometric information, the security level associated with those users will likely increase. As such, a system and method according to the present invention lessens frustration new users feel in using a system without significantly compromising long term security of the system. New users of an existing system are provided with a lower security level, $S_{new}$, which dynamically increases as they learn to better use the system.

Doorway Access System

Figure 5:
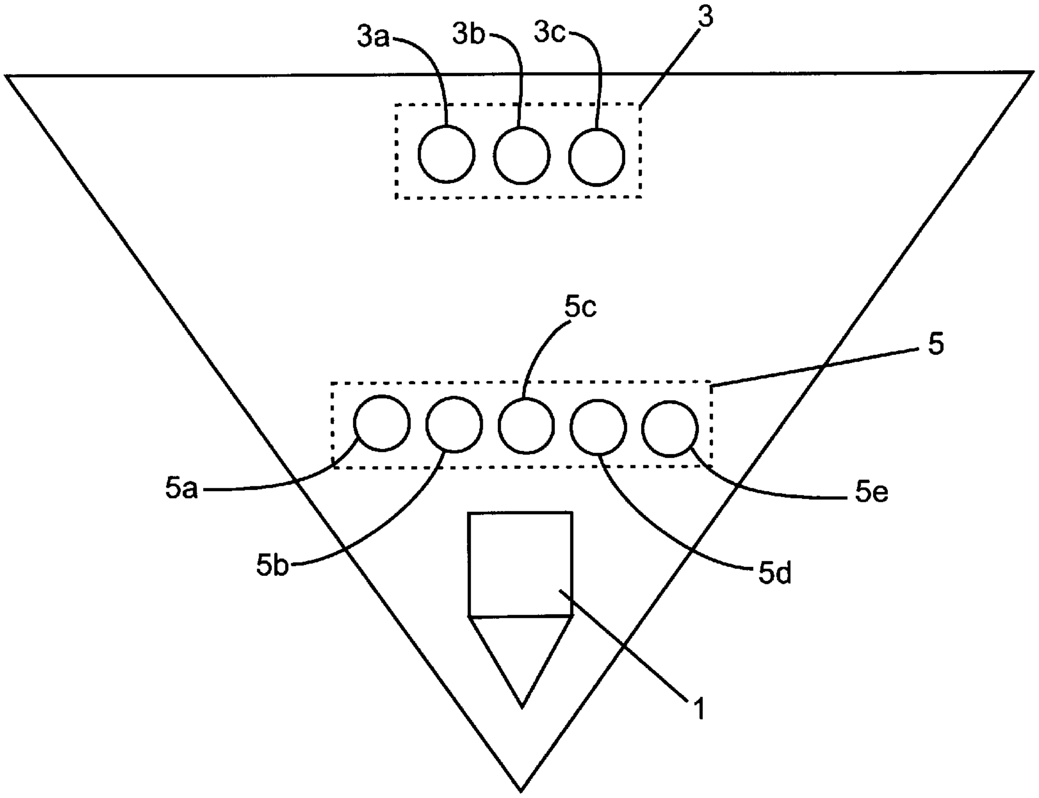
FIG. 5 is a simplified diagram of a device according to the invention for accepting biometric information.

Referring to FIG. 5, a doorway entry device is shown comprising a biometric information capture device 1 in the form of a fingerprint imager and a plurality of LEDs. The top row of three LEDs 3 indicates that registration is in progress (LED 3*a*), an individual is identified (LED 3*b*), and an individual in not identified (LED 3*c*), respectively. The row of 5 LEDs 5 indicates a fingertip from the five available fingertips on a hand to provide to the fingerprint-imaging device for use in re-authorising an individual in order to update their template and for use with flexible verification as described below. For example, LED 5*a* indicates the right thumb, LED 5*b* indicates the right index finger, LED 5*c* indicates the right middle finger, LED 5*d* indicates the right ring finger and LED 5*e* indicates the right pinkie. Optionally, the LEDs are overlaid on an image of a hand. Further optionally, other biometric information is also indicated such as the fingertips of the left hand, palm prints, voice, retinal scans, facial features, and so forth.

Figure 6:
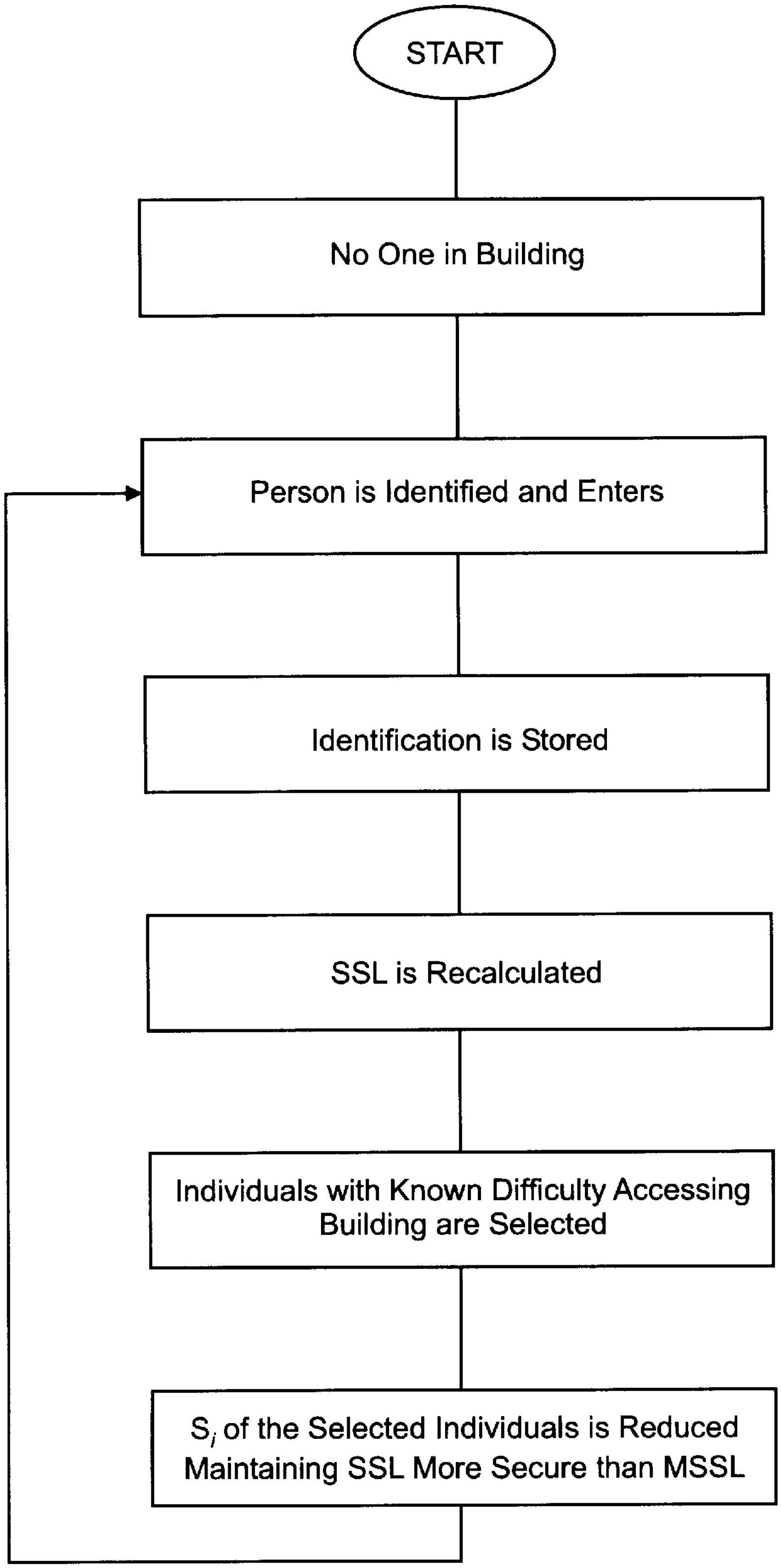
FIG. 6 is a simplified flow diagram of a method of providing building access according to the invention.

Referring to FIG. 6, a simplified flow diagram of another method according to the invention is shown. A database is maintained of persons within a facility or actively using a system. Those individuals are denied further access until they have properly exited. In this way, the security level is further improved or, alternatively, is modified to reflect the MSSL. For a doorway access system and again using the above example of 5 people with 1/1,000,000 false acceptance rate and 5 people with 1/60,000 false acceptance rate, when three people having 1/60,000 are known to be within the building, an actual system security level excluding their templates from a one-to-many search is calculated; the likelihood of false acceptance is to $(1/60{,}000)^2(1/1{,}000{,}000)^5$, which is approximately 1/26,000. When MSSL is 1/10,000, the two individuals with lower false acceptance rates are provided with even lower false acceptance rates of about 1/25,000. This facilitates their entry to the system considerably without the system security level falling below the MSSL. Actually even at that level, the false acceptance rate is less than 1/11,000. Dynamic modification of false acceptance rates is therefore possible in order to maintain ease of use for hard to identify individuals while maintaining overall system security. When the security level of individual users is not dynamically updated based on individuals already present within the building, excluding those individuals from further searches increases the system security level. As shown above, this can have significant effects on overall security.

Preferably, when dynamic allocation of security levels, $S_i$, is performed based on a database of individuals currently accessing a system, individuals who are identified either by security personnel or by the system as requiring lower false acceptance rates are the only ones whose security level $S_i$, is reduced. Of course, when people leave the building or exit, they are again identified. The security levels, $S_i$, of some individuals are increased to maintain SSL at a same or more secure level than MSSL. A straightforward approach to implementing such a system, divides the individuals who are enrolled into two groups—active identified individuals and inactive individuals. Those individuals identified as entering the secure space transfer from the latter group to the former. Those individuals identified as exiting the secure space transfer from the former group to the latter. Further data relating to individuals whose associated security level $S_i$ is decreased allows for fast updating of individual security levels when someone exits the secure space. A secure space includes within its definition a physical space having security to enter the space and an electronic environment having security to use the environment or some aspect thereof.

Figure 7:
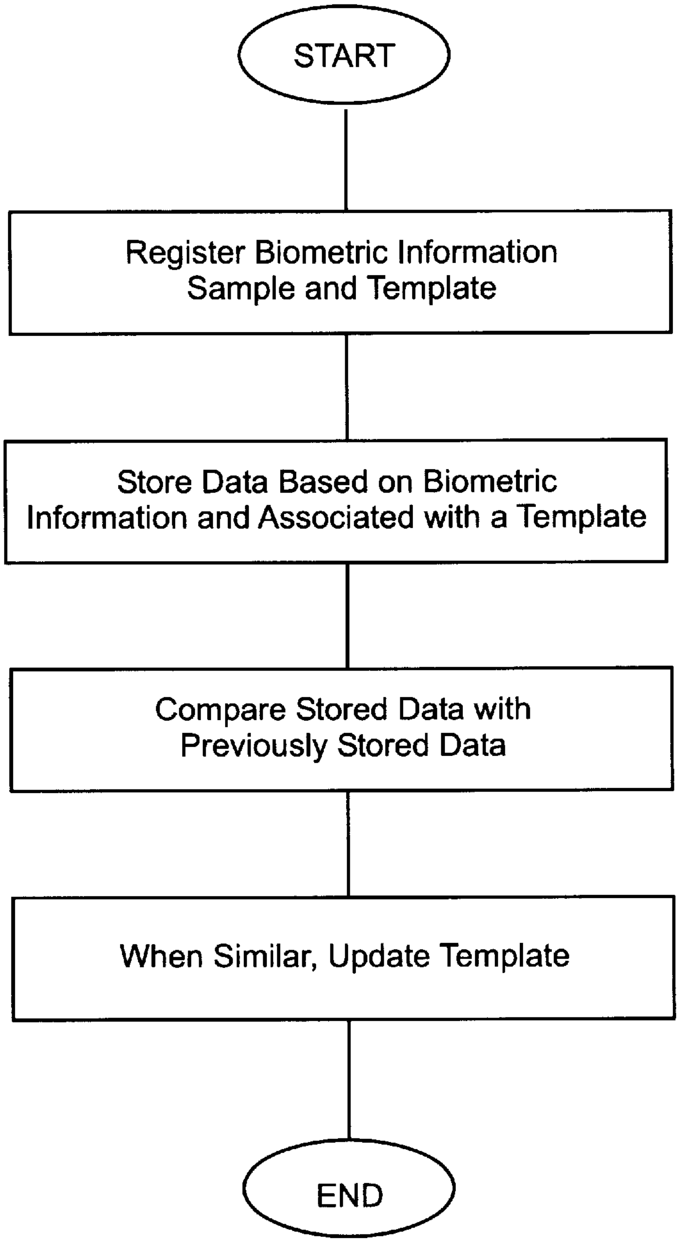
FIG. 7 is a simplified flow diagram of a method according to the invention for updating user biometric information templates.

According to another embodiment of the invention shown in simplified flow diagram in FIG. 7, past biometric samples are stored associated with each identity. When the biometric data appear consistent over a number of access attempts, a new template is generated. The new template is generated automatically. Alternatively, the new template is generated upon user authorisation. Further alternatively, an indication of the template consistency is provided to someone who is then able to initiate generation of a new template.

For automatic template generation, recently provided biometric information is used for template generation. Template generation is performed according to a known template generating technique. For example, 3 previous biometric information samples are combined to form a template. For user authorised template generation, a prompt is provided to the user requesting authorisation information in the form of another biometric information sample from a different biometric information source, for example, registration of another fingerprint or a facial recognition is performed when the user is authorised using further biometric information. Once the biometric template is updated to reflect consistent biometric information input, the security level for that user is increased to reflect that consistency. Since most users of biometric security systems enrol when they begin using the systems and, as such, provide biometric information for a first time, it is very sensible to re-enrol these individuals once their biometric information becomes more consistent. Further, this allows for an increased security level $S_i$ associated with that same individual.

One of the problems with a fingerprint biometric is that a segment of the population can have temporary or permanent skin conditions which cause poor image quality on the scanning device which in turn causes them to experience high false rejection rates. By allowing candidates to use more than one finger during authentication, lower thresholds for authentication are combined in a way which confirms identities yet does not compromise the level of false acceptances for the system.

Thresholds from a set of distinct fingerprints from a candidate that would usually be rejected for being too insecure are combined according to this method to allow acceptance in dependence upon a plurality of biometric information samples. Thus a candidate lowers the chance of being falsely rejected by supplying multiple biometric information samples in the form of fingerprints for authentication.

For example, biometric information in the form of fingerprints is provided to a processor. A plurality of samples from at least two biometric information sources are provided. These samples are in the form of fingerprints, palm prints, voice samples, retinal scans, or other biometric information samples.

Requiring an individual to enter biometric information samples from at least two biometric information sources, allows for improved registration results and reduced false acceptance. For example, some individuals are known to be commonly falsely accepted or accepted. The false acceptance often is a result of similarities between biometric information samples from a biometric information source of a registered individual and from a biometric information source of another individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces any likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are reduced.

Each biometric information sample is associated with a biometric information source in the form of a fingertip, a retina, a voice, a palm, etc. The association, allows for comparison between the biometric information sample and a template associated with the biometric information source. When an individual's identity is provided to the processor or is known, the biometric information sample is only compared to a single template associated with the biometric information source. Alternatively, the biometric information sample is compared against a plurality of templates. Comparing biometric information samples is often referred to as registering the biometric information samples. Many methods are known for performing the registration. Commonly, the biometric information sample is characterized according to a method specific to the template. The template and the characterized biometric information sample are compared to determine a registration value. The registration value is then used to determine identification; to provide access to a system or structure; to log access; to monitor use; for billing; or for other purposes.

A biometric input means in the form of a live fingerprint scanning device is used to collect the biometric information in the form of images of fingerprints of the individual which are entered in a predetermined order due to prompting. Each biometric information sample is identified. When the individual is prompted for a biometric information sample, the processor labels the samples.

The authentication procedure determines an independent sequence of comparison scores from the input provided by the candidate. This sequence is considered to be a point, hereinafter referred to as P, in n-dimensional vector space, $R^n$. A threshold function $h_\alpha: R^n \rightarrow R$ is used to determine whether or not the point belongs to a set $U_\alpha$ by $P \in U_\alpha \Leftrightarrow h_\alpha(P) \geqq C_\alpha$. The identity of the individual is confirmed if and only if $P \in U_\alpha$.

The biometric information sample identifiers are used to uniquely identify the input samples. Let I be the set of input images, $I=\{I_i | 1 \leqq i \leqq N\}$. For $I_i \in I$, let $Id_i$ be the identifier of an image, let $T_i$ be the characterisation or template of the image, and let $T_1^*$ be the reference template of the image.

Define the equivalence relation $\equiv$, on the set I by $$I_i \equiv I_j \Leftrightarrow Id_i = Id_j,$$

The sets $$H_k = \{I_i | I_i \equiv I_k\}$$

are equivalence classes that partition the set of input images into sets of images that belong to a same finger tip. There are n of these classes where $1 \leqq n \leqq N$.

When $\tau$ is a set of all fingerprint templates generated by a given characterisation algorithm and score: $\tau \times \tau \rightarrow R$ is the measure generated by an associated matching algorithm, then we can construct a set of class representative, $I_R$, which contains one representative for each $H_k$:

$$I_R = \left\{ I_j \in H_k \mid \text{score}(T_j, T_j^*) = \max_{I_i \in H_k} \{\text{score}(T_i, T_i^*)\}, 1 \leq k \leq N \right\}$$

The set $I_R \subseteq I$, is then a set of images of the distinct input fingerprints that achieve the highest scores. Alternatively, multiple samples of a same fingerprint are considered.

For each $I_i \in I_R$, $1 \leqq i \leqq n$, let $x_i = \text{score}(T_i, T_i^*)$ correspond to scores from the matching algorithm. Any ordering of these scores is a point in the vector space $R^n$, simply by constructing the n-tuple $(x_1, x_2, \ldots, X_n) = P$.

Essentially, once a set of parameters is selected, a graphical distribution of identifications is achievable in n-dimensions. The biometric information samples are provided to a processor. Registration is conducted against known templates in dependence upon the selected parameters. Once registration is complete, a single point is determined having coordinates equal to each of at least some of the registration results. Alternatively, the point has coordinates determined in dependence upon the registration results but not equal thereto. Plotting the point results in a point plotted in n-dimensional space. The processor then determines a probability distribution for the selected parameters. Alternatively, this is performed prior to the registration process for biometric information samples. Further alternatively, the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analysed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known and are beyond the scope of the present invention.

Figure 8:
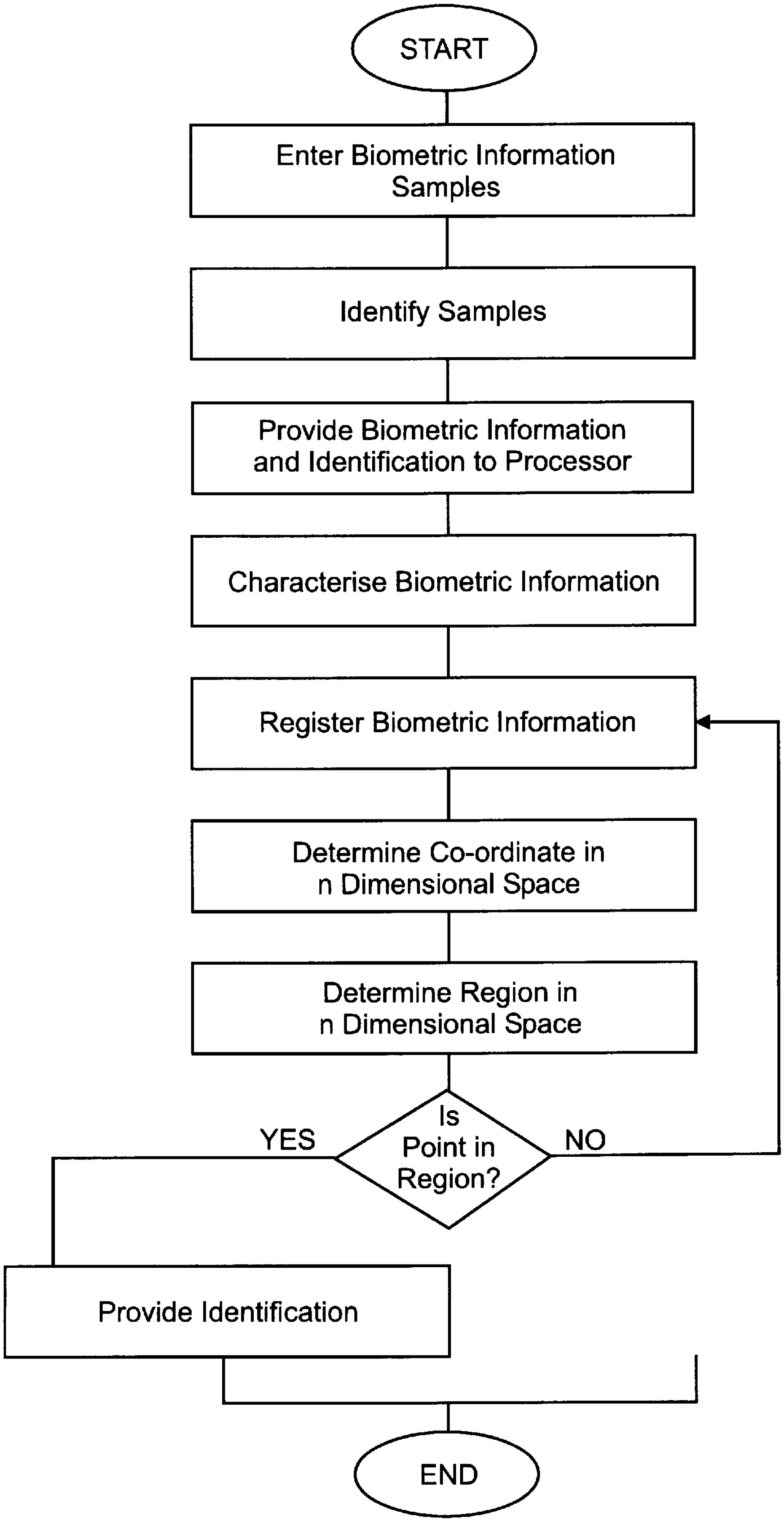
FIG. 8 is a simplified flow diagram of a method of identifying an individual using two biometric information samples.

Referring to FIG. 8, a simplified flow diagram of a method according to the invention is shown. A plurality of biometric information samples from an individual is provided to a processor. The processor characterises the biometric information samples and registers them against templates. Registration of the biometric information samples is performed against a plurality of associated templates producing registration values. The registration values define a point in an n-dimensional space. In dependence upon this point and a region within the n-dimensional space, the region representing a security level Si associated with the same individual, determining when the likelihood is within predetermined limits for an acceptable likelihood and providing an identification. When the point falls outside the region representing a security level Si identification is not provided and a next set of templates is selected. Optionally, once all sets of templates are exhausted, an indication of failure to identify is provided.

Figure 9:
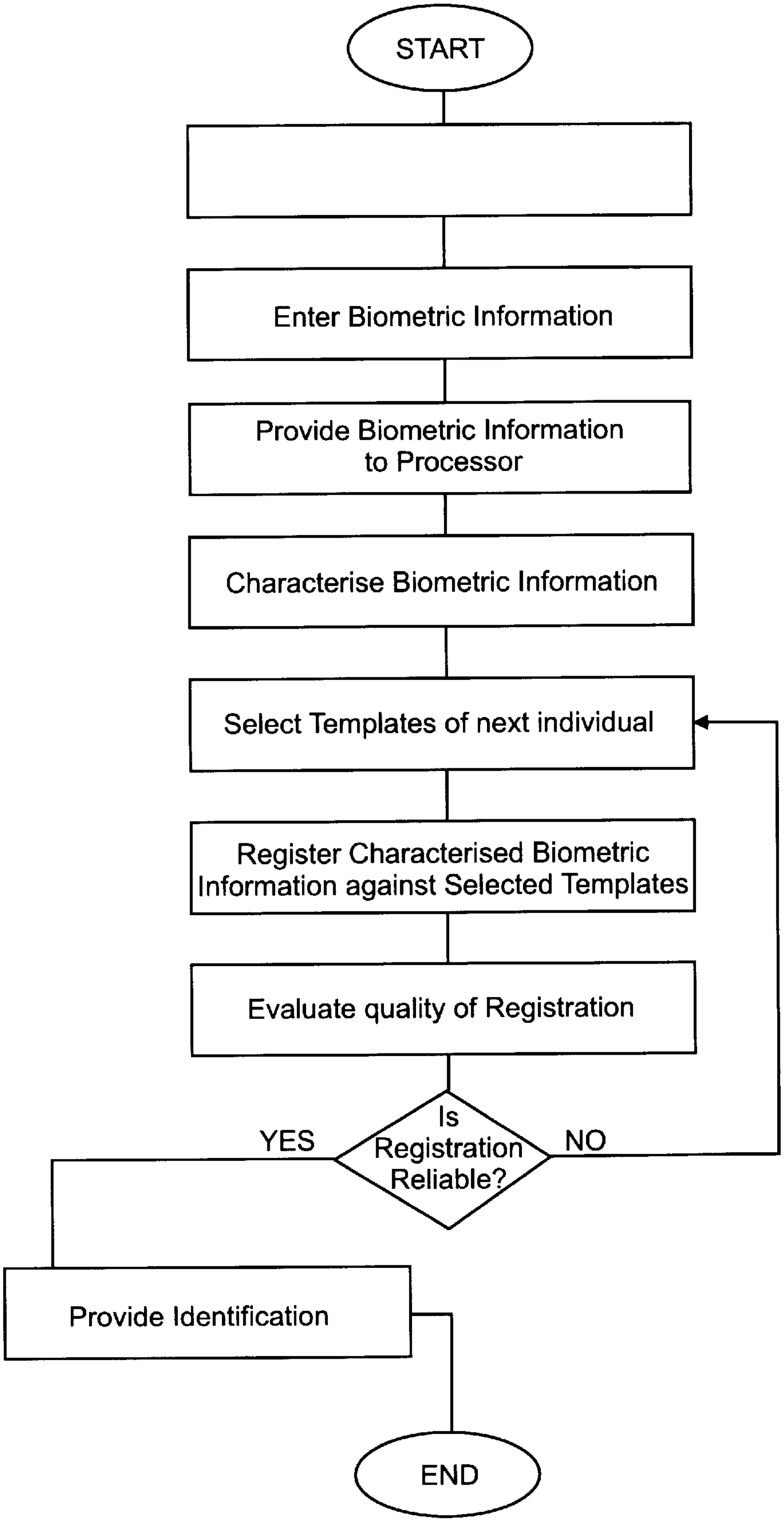
FIG. 9 is a simplified flow diagram of a further method of identifying an individual using two biometric information samples.

Referring to FIG. 9, a simplified flow diagram of a method according to the invention is shown. A biometric information sample from an individual is provided to a processor. The processor characterises the biometric information samples and registers them against templates. Registration of the biometric information samples is performed against a plurality of associated templates producing registration values. In dependence upon these values a likelihood of accurate user identification is determined. The likelihood is indicative of a security level that is then compared to $S_i$ associated with the same individual. When the likelihood is within predetermined limits for an acceptable likelihood, identification is provided. When the value falls outside the predetermined limits identification is not provided and a next set of templates is selected. Optionally, once all sets of templates are exhausted, an indication of failure to identify is provided.

Figure 10:
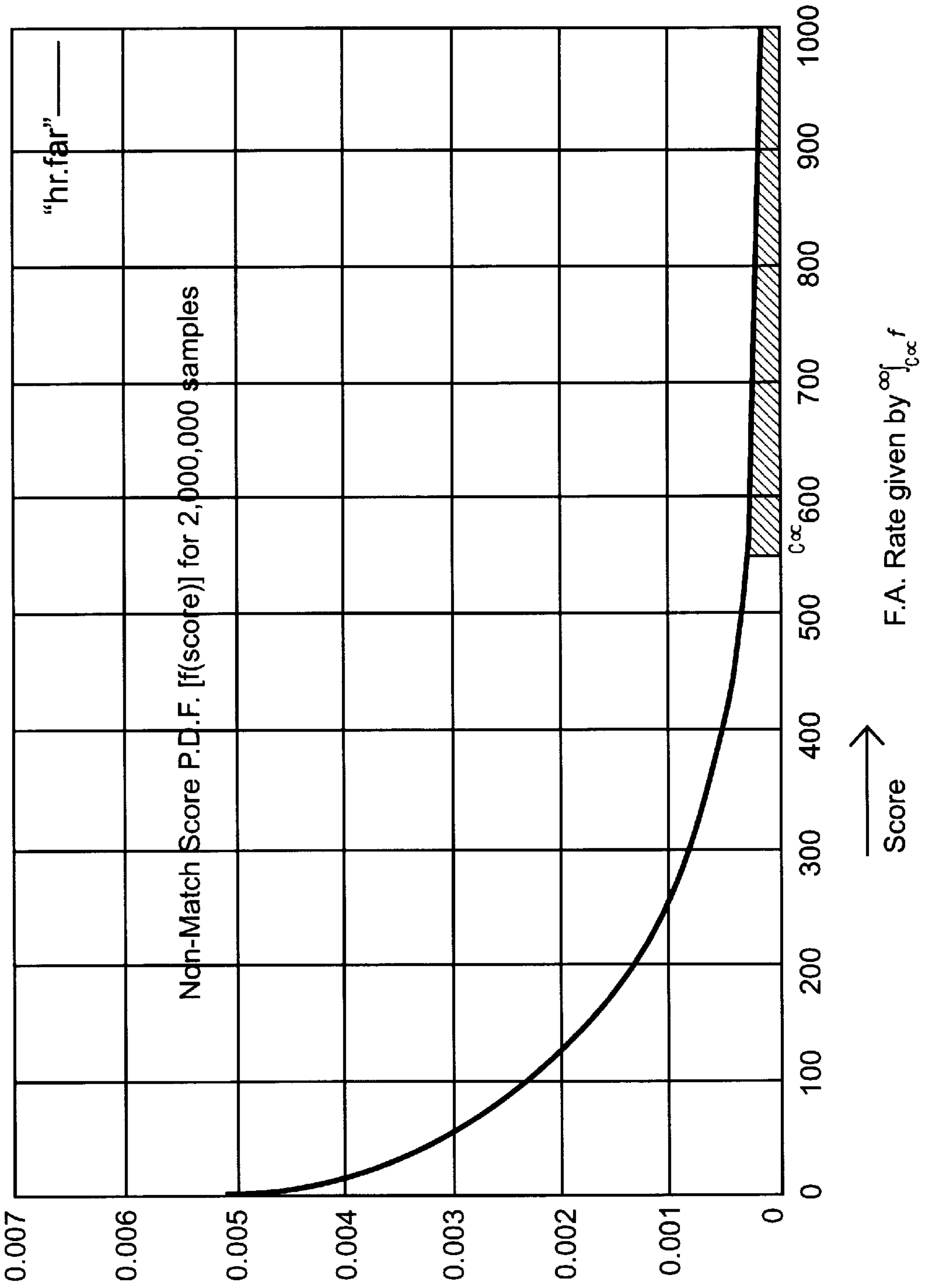
FIG. 10 is a two-dimensional false acceptance curve.
Figure 11:
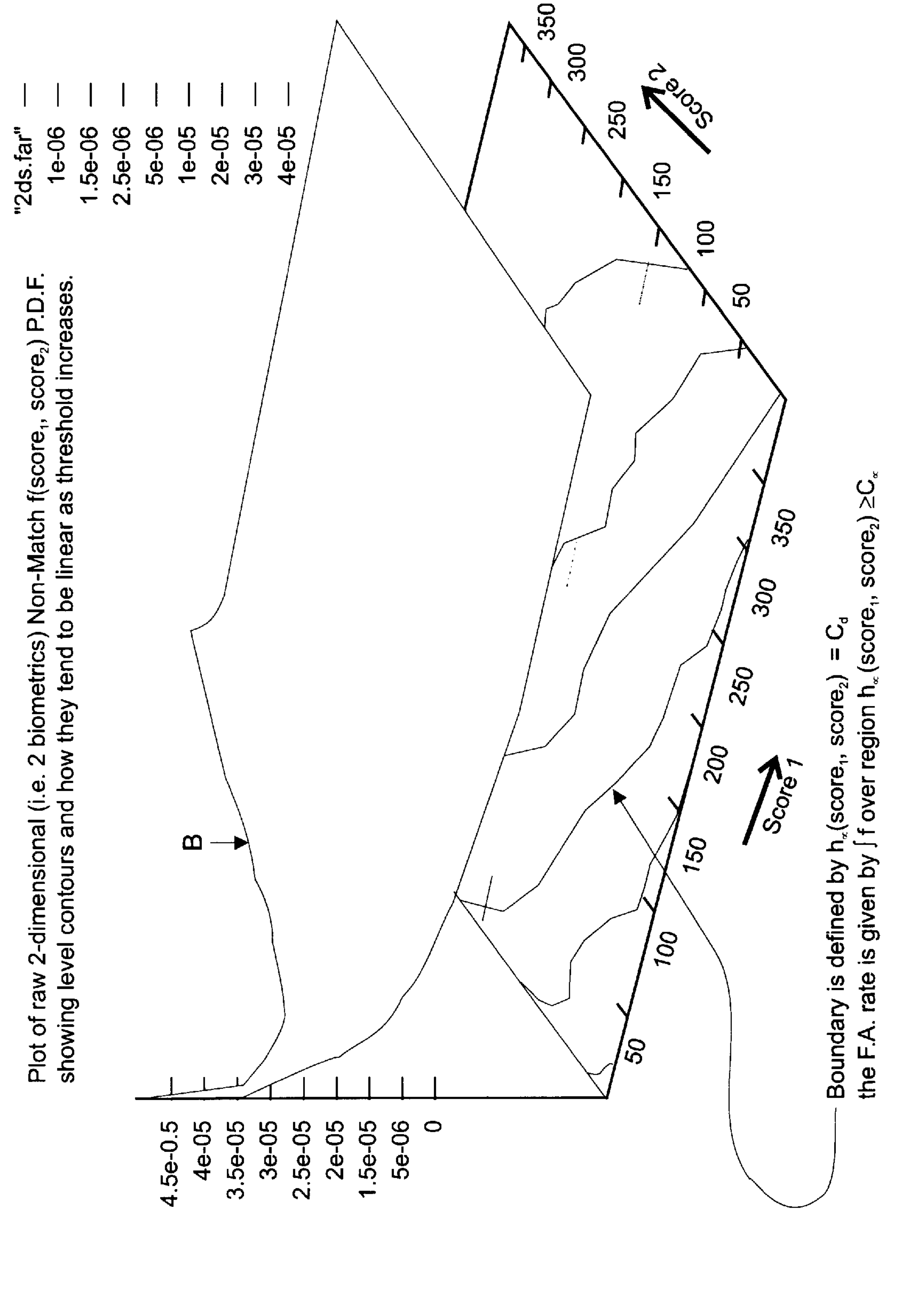
FIG. 11 is a three-dimensional false acceptance curve.

Referring to FIG. 10, a two dimensional probability distribution is shown. The total area below the distribution curve is 1 unit area. Using such a curve, false acceptance or false registration is described. Most biometric information samples are easily characterised. The high initial point on the probability curve and the steep decent to an asymptotic curve approaching 0 shows this. The line t marks the cut-off for registration effectiveness. This is determined in dependence upon an algorithm chosen and upon system limitations such as processor speed, memory, and security requirements. The shaded region bounded by Y=0, X>t, and the probability curve represents false acceptances.

Referring to FIG. 10, a truncated two-dimensional probability distribution curve is shown. Now, false acceptance is represented by a region of three-dimensional space having a volume of 1 unit$^2$ or less. Upon viewing the graph of actual data for fingerprint biometric information, it is apparent that the graph is symmetrical and that the graph extends toward infinity without reaching the plane z=0. Further, the diagonal centre of the surface x=y is a minimum for a given x and y.

Extending the graph of FIG. 10 to n dimensions, results in a different distribution for a region representing acceptance and, therefore, a match scores of a single biometric information sample that falls outside the shaded region of FIG. 10, when combined with several other similarly weak biometric information samples, is more likely to fall within an acceptable region. A reasonable correlation among several identifiers is a good indication of identity. Alternatively, using only a single biometric information sample, a low match score results in failure to authorise an individual. Likewise, a different individual entering a plurality of biometric information samples and trying to gain unauthorised access by, for example, posing as an authorised individual, is unlikely to match evenly across all samples and, whereas a single biometric information sample may match well, several will not. Further examination of an acceptance graph shows that excellent match scores of some samples reduces the necessary match scores for other samples for authorisation to occur.

The probability density function is discussed below. Assume a probability density function, $f$, of non-match scores exists. That is, $$f:R\rightarrow[0,1]$$

and $$\int_R f=1$$

If $S=\{x|x=\text{score}(T_a, T_b)$, where $T_a$ and $T_b$ are characterisations of distinct fingerprints$\}$, then $f$ is 0 outside of S, and $$\int_S f=\int_R f=1$$

It should be noted that $x\gamma S\Rightarrow x\geqq 0$ since score is a measure. An n-dimensional probability density function, g for a sequence of non-match scores is constructed by:

$$g(P)=\prod_i^n f(x_i), \quad \text{for } P\in R^n$$

Since each $f(x_i)\geqq 0$, then it follows that $g(P)\geqq 0$ and that $$\int_R f=1\Rightarrow\int_{R^n} g=1$$

For any subset $U\subseteq S^n$, the probability that a collection of n scores of non-matching fingerprints lies in U is given by:

$$\int_U g$$

Given an n-dimensional probability density function, g, a region, $U_\alpha\subseteq S^n$ is defined, bounded "below" by a function, $h_\alpha:R^n\rightarrow R$.

$$U_\alpha=\{P\in S^n|h_\alpha(P)\geqq C_\alpha\}.$$

$C_\alpha$, a constant, is calculated such that:

$$\int_{U_\alpha} g=\alpha$$

Thus, given a collection of n fingerprint match scores in the form of a point P, we determine when $P\in U_\alpha$ by applying the threshold function $h_\alpha$. Moreover, the probability that such a collection of scores belongs to $U_\alpha$ is $_\alpha$ which can be interpreted as a predetermined false acceptance rate. The criteria $$h_\alpha(P)\geqq C_\alpha$$

is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. X=score ($T_a$, $T_b$), where $T_a$, $T_b\in\tau$ are templates of different fingerprints. Note that the frequency distribution is a function of a discrete variable. For the purposes of the test case, we assumed that a continuous probability density function, $f(x)$, of non-matching fingerprint comparisons exists, and all derivations are performed for the continuous case. When a calculation was required in dependence upon actual data, $f$ was approximated by F, and integration was replaced by summation.

When we are given a sequence of n non-matching fingerprint scores, $\{x_i\}$, $1\leqq i\leqq n$, then an n-dimensional probability density function, g, is derived as follows: Let $$P=(x_1,x_2, \ldots ,x_n)$$

be a particular ordering of the sequence.

Define $\quad g(P)=\prod_i^n f(x_i);$ since $\quad \int_R f=\int_S f=\int_0^\infty f(x)dx=1$ and $\quad R^n=R^{n-1}\times R$ it follows that -continued $$\int_{R^n} g = \int_{R^n} \prod_i^n f(x_i) d\bar{x}$$

$$= \int_{R^{n-1}} \left( \int_R \left( \prod_i^{n-1} f(x_i) \right) f(x_n) dx_n \right) dx^{n-1}$$

$$= \int_{R^{n-1}} \left( \prod_i^{n-1} f(x_i) \int_R f(x_n) dx_n \right) dx^{n-1}$$

$$= \int_{R^{n-1}} \left( \prod_i^{n-1} f(x_i) \cdot 1 dx^{n-1} \right.$$

$$= \int_{R^{n-1}} \left( \prod_i^{n-1} f(x_i) dx^{n-1} \right.$$

Repeatedly applying iterated integrals in such a manner, eventually results in $$\int_{R^n} g = 1$$

When $U \subseteq R^n$, the probability that a collection of n scores of non-matching fingerprints lies in U is calculated by iterated integrals over rectangles in $R^n$ by:

$$\int_u g = \int_R g \cdot \chi u$$

where $U \subseteq R$, and R is a rectangle in $R^n$, and $\chi u$ is the characteristic function of the set U $$\chi u(P) = \begin{cases} 1 & P \in U \\ 0 & P \notin U \end{cases}$$

assuming that $\chi u$ and $f$ are integrable. In the discrete case, we analogously define $$G(P) = \prod_i^n F(x_i)$$

G(P) gives the probability that the n independent scores, $\{x_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that α and β are false acceptance rates. We would like to define regions $U_\alpha$, $U_\beta \subseteq R^n$ such that:

$$\int_{U_\alpha} g = \alpha \quad \text{and} \quad \int_{U\beta} g = \beta \tag{1}$$

$$U_\alpha = \{P \in S^n \mid h_\alpha(P) \geq C_\alpha\},\ U_\beta = \{P \in S^n \mid h_\beta(P) \geq C_\beta\} \tag{2}$$

$$\alpha \leq \beta \Rightarrow U_\alpha \subseteq U_\beta \tag{3}$$

$$h_\alpha(P) = C_\alpha \Rightarrow g(P) \approx K_\alpha,\ h_\beta(P) = C_\beta \Rightarrow g(P) \approx K_\beta \tag{4}$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_\beta \leqq C_\alpha$. The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, g* is constructed from the probability density function of fingerprint match scores. The corresponding false rejection rate for an n-dimensional false rejection rate $_\alpha$ is given by:

$$\int_{S^n - U_\alpha} g^*$$

Alternatively, the method is employed with retinal scanned biometric information. Further Alternatively, the method is employed with palm prints. Further Alternatively, the method is employed with non-image biometric data such as voice prints.

One consequence of two different biometric sources is that the above math is complicated significantly. As a false acceptance rate for fingerprints may differ significantly from that of voice recognition devices or retinal scans, a different f(x) arises for the two latter cases resulting in asymmetric regions. For only fingerprint biometric information, ordering of samples is unimportant as false acceptance rates are substantially the same and therefor, the regions defined for registration are symmetrical as shown in FIG. 9 When different biometric source types are used and different functions for false acceptance result, order is important in determining point coordinates and an axis relating to voice recognition false acceptance should be associated with a coordinate value for same.

Figure 12:
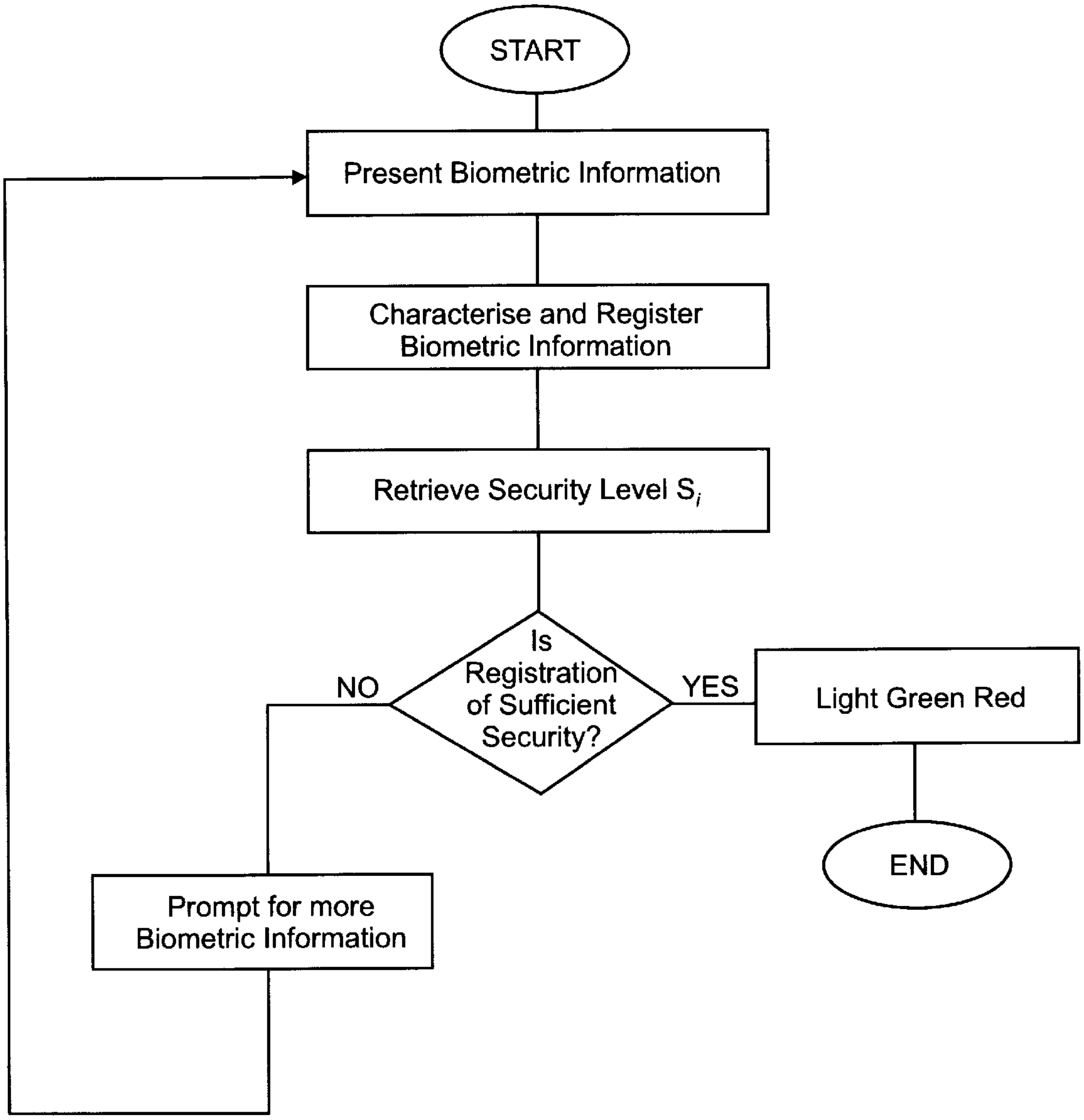
FIG. 12 is a simplified flow diagram for a biometric information actuated doorway access system according to the invention.

Referring to FIG. 12, a method of using a multiple biometric information input system as shown in FIG. 4 is disclosed. A user presents biometric information to the biometric input device. The information is characterised and the characterised information is matched against a template. When a successful registration occurs, user identification is made and the process is complete. When an unsuccessful registration occurs, the user is prompted for another biometric information sample. Optionally, the system prompts for each biometric information source a plurality of consecutive times.

For example, a user presents their index finger to a fingerprint scanner; registration fails and access is denied. The user again presents their index finger to the fingerprint scanner; registration fails and access is denied. The user again presents their index finger to the fingerprint scanner; registration fails and access is denied. The user is prompted to present their middle finger to the fingerprint scanner. The registration of the middle finger is performed according to the invention and therefore is not a same registration process as when the middle finger is the first finger presented to the scanner. The registration relies on the best registration value from the index fingerprints and, with the registration results from the middle finger, determines whether identification should proceed. When unsuccessful registration occurs, the middle finger is presented two more times. When registration is still unsuccessful, another biometric information sample is requested. Optionally, when registration results fall below a predetermined threshold, user identification fails. Alternatively, user identification fails when known biometric information sources of the user are exhausted. Of course, whenever a resulting registration value considered with previous registration values according to the invention results in a sufficiently accurate identification, the user is identified.

Because of the nature of, for example, fingerprints, the use of multiple fingerprints from a same individual provides an additional correlation as discussed herein. In an embodiment, with each fingerprint presented, analysis and registration provides one of three results—identified, rejected, unsure. When unsure, more biometric information is requested, for example, by lighting the yellow LED. The individual provides additional fingerprint data and again one of the three results is provided. When an identification or rejection occurs, the process stops. Optionally, a log of access attempts is maintained for later review.

Since, using the device of FIG. 4 a user identity is not provided, a data structure indicating a next biometric information source to request is produced from all biometric information. In dependence upon a registration value of a current biometric information sample, user identification, rejection, or requesting further biometric information results. In the latter case, the requested information is determined based on the known biometric information and registration values associated therewith. For example, biometric information is provided from a first biometric information source. Registration is performed and is inconclusive. It is determined that a particular biometric information source comprises information most likely to result in identification or failure thereby being determinative; that biometric information source is polled.

When selecting subsequent biometric information sources, preferably, all possible outcomes are analysed and the outcome of failed identification is not itself considered a single outcome but is weighted more heavily. The advantages to this approach are evident from the example below.

In another example for use in identifying individuals by searching a database of enrolled individuals, biometric information is provided from a right thumb. Registration is performed and is inconclusive determining that the right thumb is likely that of John, Susan, or Peter but may also be that of Jeremy, Gail, Brenda, or Joe. A next biometric information source is selected such that clear discrimination between the individuals results and a likely identification will occur. The next biometric information source is one that easily eliminates a large number of the potential individuals. In this example, the right ring finger is selected because Susan and Peter have very distinctive ring fingers. Biometric information from the right ring finger is provided and registered with templates in the database. Though the right ring finger is most likely that of Jim or Susan, it is evident that Susan, appearing in both lists, is the front runner. Also, the registration result for Peter is sufficiently low that it is unlikely that Peter is the individual. Though neither registration value would identify Susan on its own with the desired level of security, when the two registrations are taken together, Susan is indeed identified. Alternatively, when the resulting list is still not conclusive—two or more people identified or noone identified with sufficient certainty, further biometric information from another biometric information source is requested.

The data is arranged such that in dependence upon previous registration results a next biometric information source is polled. Using such a system, searching large databases for accurate registration is facilitated and reliability is greatly increased. Preferably, the database is precompiled to enhance performance during the identification process.

When flexible verification is used as described above, security levels are adjusted to make the system most convenient for a majority of users. Alternatively, security levels are adjusted to make it more convenient for specific users. Most importantly, system security levels, $S_i$, are adjusted to provide each user with reasonable access through such a system. For example, using a normal distribution, 50 percent of the individuals are selected to gain access with provision of a single biometric information sample. 40 percent of the individuals require provision of two biometric information samples. The remaining ten percent require three or more biometric information samples. Such a system allows for individual users of the system to experience a reasonable level of security with a minimum of inconvenience.

According to another embodiment, when several templates are determined to be possible matches with provided biometric information, the system is trained to distinguish therebetween. Often, a first individual will be identified as another individual, but the other individual is not misidentified. When this happens, one of the individuals is often identified with a greater likelihood. When that individual is correctly identified, the security level is adjusted to fall between typical likelihoods for identification such that the individual correctly identified is identified with a likelihood indicative of a security level above the security level and the other individual is identified with a likelihood indicative of a security level below the security level. When the other individual is incorrectly identified with a greater likelihood, the template is replaced until adjustment of the associated security level allows for a clear distinction between the individuals.

Numerous other embodiments may be envisaged without departing from the spirit and scope of the invention.

What is claimed is:

1. A method of performing one of authorising individuals and identifying individuals using a biometric security system comprising the steps of:

storing a system security level;

determining an initial security level for a plurality of individuals, the initial security level determined such that the actual security level of the system is at least the stored system security level;

storing a current security level in association with at least one of an identification of an individual and an authorisation of an individual;

performing at least one of authorising individuals and identifying individuals using the biometric security system to determine a likelihood that the individual is accurately authorised or identified;

determining individuals who are consistently authorised or identified, the likelihood indicative of a higher level of security than the current security level associated with said individuals;

increasing the current security level associated with the determined individuals;

determining individuals who are consistently authorised or identified identified, the likelihood indicative of a lower level of security than the current security level associated with said individuals; and, lowering the current security level associated with the determined individuals such that the resulting actual system security level is at least the stored system security level.

2. In a system comprising means for storing a plurality of biometric templates, each biometric template associated with an identity and a security level, some of the biometric templates associated with different security levels, a method of identifying an individual from a plurality of enrolled individuals comprising the steps of:

receiving biometric information from the individual and providing biometric data based on the biometric information;

comparing the biometric data to some templates from the plurality of biometric templates to determine a likelihood that a first template from the plurality of templates and the biometric data match;

retrieving the associated security level associated with the first template;

when the likelihood is indicative of a match with a level of security at least the associated security level, identifying the individual;

storing the determined likelihood in association with the first template;

retrieving a previously determined likelihood associated with the first template; and, increasing the security level associated with the first template when the previously determined likelihood and the determined likelihood are indicative of matches with security levels substantially above the security level associated with the first template.

3. A method as defined in claim 2 comprising the steps of:

storing a system security level;

storing the determined likelihood in association with the first template;

retrieving a previously determined likelihood associated with the first template;

increasing the security level associated with the first template when the previously determined likelihood and the determined likelihood are indicative of matches having security levels substantially above the security level associated with the first template; and, reducing the security level associated with another template from the plurality of templates to maintain the overall system security level at approximately the stored system security level.

4. A method as defined in claim 2 comprising the steps of:

storing the determined likelihood in association with the first template;

comparing the determined likelihood and a previously determined likelihood associated with the first template; and, storing a new template as the first template when the previously determined likelihood and the determined likelihood are substantially similar and when the likelihoods are within a first range of values.

5. A method as defined in claim 4 comprising the step of:

increasing the security level associated with the first template when the previously determined likelihood and the determined likelihood are substantially similar and when the likelihoods are within the first range of values.

6. A method as defined in claim 2 comprising the steps of:

storing the determined likelihood in association with the first template;

comparing the determined likelihood and a previously determined likelihood associated with the first template; and, when the previously determined likelihood and the determined likelihood are substantially similar, prompting the individual to provide authorisation information, receiving the authorisation information from the individual, and storing a new template as the first template when the authorisation information is indicative of user authorisation to store a new template.

7. A method as defined in claim 2 wherein when the likelihood is indicative of a match with a security level less than the associated security level, the method comprises the steps of:

prompting the individual to provide further biometric information;

receiving the further biometric information from the individual and providing further biometric data in dependence thereon;

comparing the further biometric data to a second template from the plurality of biometric templates and associated with the first template to provide a new comparison result;

determining a second likelihood that the biometric data and the further biometric data are from a known individual in dependence upon the previously determined likelihood and the new comparison result;

when the second likelihood is indicative of a security level having at least the associated security level, identifying the individual; and, storing data indicative of a difficulty of identifying the individual in association with the first and second templates.

8. A method as defined in claim 7 comprising the steps of:

storing a system security level; and, when the actual system security level is better than the stored system security level, lowering a security level associated with templates that are associated with data indicative of substantial difficulty identifying the individual.

9. A method as defined in claim 2 comprising the steps of:

storing a system security level;

maintaining a database of individuals, the individuals divided into two groups—active identified individuals and inactive individuals;

recalculating the actual system security level based only upon security levels associated with the inactive individuals; and lowering the security level associated with some of the inactive individuals to result in a lower actual security level of at least the stored system security level.

10. A method as defined in claim 9 comprising the step of:

identifying those individuals passing from one group to another and recalculating the actual system security level upon a change to the group of inactive individuals, wherein the security levels of inactive individuals are automatically adjusted to maintain an actual security level of at least the stored security level.

11. In a system comprising means for storing a plurality of biometric templates, each biometric template associated with a security level, some of the biometric templates associated with different security levels, a method of authorising an individual from a plurality of enrolled individuals comprising the steps of:

receiving biometric information from the individual and providing biometric data based on the biometric information;

comparing the biometric data to some templates from the plurality of biometric templates to determine a likelihood that a first template from the plurality of templates and the biometric data match;

retrieving the associated security level associated with the first template;

when the likelihood is indicative of a match with a level of security at least the associated security level, authorising the individual;

storing the determined likelihood in association with the first template;

retrieving a previously determined likelihood associated with the first template; and, increasing the security level associated with the first template when the previously determined likelihood and the determined likelihood are indicative of matches with security levels substantially above the security level associated with the first template.

12. A method as defined in claim 11 comprising the steps of:

storing a system security level;

storing the determined likelihood in association with the first template;

retrieving a previously determined likelihood associated with the first template;

increasing the security level associated with the first template when the previously determined likelihood and the determined likelihood are indicative of matches having security levels substantially above the security level associated with the first template; and, reducing the security level associated with another template from the plurality of templates to maintain the overall system security level at approximately the stored system security level.

13. A method as defined in claim 11 wherein when the likelihood is indicative of a match with a security level less than the associated security level, the method comprises the steps of:

prompting the individual to provide further biometric information;

receiving the further biometric information from the individual and providing further biometric data in dependence thereon;

comparing the further biometric data to a second template from the plurality of biometric templates and associated with the first template to provide a new comparison result;

determining a second likelihood that the biometric data and the further biometric data are from a known individual in dependence upon the previously determined likelihood and the new comparison result;

when the second likelihood is indicative of a security level having at least the associated security level, authorising the individual;

calculating the actual security level of the system; and, when the calculated actual security level is above a system security level, lowering the associated security level associated with the template such that the actual security level remains above the system security level.

14. A system for performing one of authorising an individual and identifying an individual from a plurality of individuals upon presentation of biometric information of the individual comprising:

means for storing a plurality of biometric templates, each biometric template associated with a security level wherein some templates are associated with different security levels;

means for receiving biometric information from the individual and providing biometric data based on the biometric information;

means comparing the biometric data to some templates from the plurality of biometric templates to determine a likelihood that a first template from the plurality of templates and the biometric data match;

means retrieving the associated security level associated with the first template;

means for performing at least one of identifying the individual and authorising the individual when the likelihood is indicative of a match with a level of security at least the associated security level;

means for storing the determined likelihood in association with the first template;

means for retrieving a previously determined likelihood associated with the first template; and, means for increasing the security level associated with the first template when the previously determined likelihood and the determined likelihood are indicative of matches with security levels substantially above the security level associated with the first template.

15. A system as defined in claim 14 comprising:

means for storing a system security level;

means for storing the determined likelihood in association with the first template;

means for retrieving a previously determined likelihood associated with the first template;

means for increasing the security level associated with the first template when the previously determined likelihood and the determined likelihood are indicative of matches having security levels substantially above the security level associated with the first template; and, means for reducing the security level associated with another template from the plurality of templates to maintain the overall system security level at approximately the stored system security level.

16. A system as defined in claim 14 comprising:

means for storing a system security level;

means for maintaining a database of individuals, the individuals divided into two groups—active identified individuals and inactive individuals;

means for recalculating the actual system security level based only upon security levels associated with the inactive individuals; and means for lowering the security level associated with some of the inactive individuals to result in a lower actual security level of at least the stored system security level, when the calculated actual security level is substantially above the system security level.

* * * * *